United States Patent [19]

Perry

[11] Patent Number: 5,014,890

[45] Date of Patent: May 14, 1991

[54] BICYCLE RACK FOR USE IN PICKUP TRUCKS

[76] Inventor: Wayne Perry, 7020 Palm Ave., Fair Oaks, Calif. 95628

[21] Appl. No.: 451,923

[22] Filed: Dec. 18, 1989

[51] Int. Cl.$^5$ ............................................... B60R 9/10
[52] U.S. Cl. .............................. 224/42.46 R; 224/324; 224/42.03 B; 224/901; 224/329; 24/306; 248/499
[58] Field of Search ............. 224/273, 42.39, 42.46 R, 224/901, 329, 331, 324, 420.3 B; 410/3; 24/306, 442, 300, 301, 302; 211/17; 248/499, 205.2; 128/DIG. 15

[56] References Cited

U.S. PATENT DOCUMENTS

| | | | |
|---|---|---|---|
| 2,409,946 | 10/1946 | MacLeod | 224/324 |
| 2,423,253 | 7/1947 | Potts et al. | 224/329 |
| 2,983,413 | 5/1961 | Verwers | 224/324 |
| 3,923,221 | 12/1975 | Ballinger | 224/42.03 B |
| 4,022,362 | 5/1977 | Revercomb | 224/324 |
| 4,709,840 | 12/1987 | Allen | 224/314 |

FOREIGN PATENT DOCUMENTS

Z2699  12/1955  Fed. Rep. of Germany ........ 24/302
15555  of 1893  United Kingdom .................. 211/17

OTHER PUBLICATIONS

Yakima, Co. Ad, Id Pick Up Truck Rack Rev 3-90.

Primary Examiner—Linda J. Sholl

[57] ABSTRACT

A bicycle rack consisting of a strap (10) that is anchored on opposite walls of the truck bed (70a, 70b) at the top lips of the walls (80a, 80) by claws (20a, 20b). The bicycle is held in place by a clasping member (15) which enables the rack to accommodate various diameters of bicycle top tubes (90). The rack can hold as many bicycles as it has clasping members (15) The strap (10) length is adjustable to fit various truck bed widths by use of buckles (30a, 30b). The reack can be easily removed by loosening the strap (10) at the buckles (30a, 30b). It can then be stored in as small a place as a glove compartment.

4 Claims, 3 Drawing Sheets

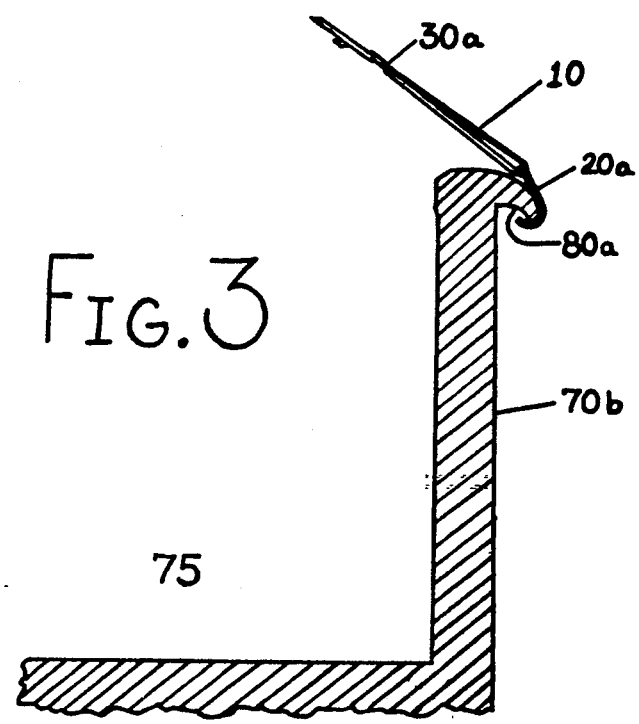

BICYCLE RACK FOR USE IN PICKUP TRUCKS

BACKGROUND

1. Field of the Invention

The present invention relates to a load racks, specifically to those used as bicycle racks on pickup trucks.

2. Description of Prior Art

There are a very few racks or carriers that are presently available for transporting bicycles on pickup trucks. The carrier with U.S. Pat. No. 4,709,840 to Allen (1985) is a carrier that is clamped to the tailgate of a pickup truck. When more than one bicycle is placed onto the carrier, they come in contact with one another which can scratch, bend or otherwise damage the contacted parts. Another carrier, manufactured by Yakima Co. in Arcada, Ca. 95521, that is presently on the market with a patent pending is one that spans with the width of the truck bed and is anchored on each side to the side walls of the truck bed. In its basic model, it holds only two bicycles. Additional holders can be added, but at a high monetary cost. Also, the bicycles to be transported must be partially disassembled to be mounted on the rack. A common characteristic of both of these carriers is that they include in their components large metal parts which are costly to manufacture. In addition, these carriers, when removed from the vehicle require a large amount of space in which it can be stored. Another load rack with U.S. Pat. No. 2,983,413 to Verwers (1961) is a cargo securing device that may be used on a pickup. However, securing a bicycle to this device would be cumbersome since the strap to secure the bicycle must be tied to at least two rings that are used in conjunction with anchoring elements after creating loops in the main strap through the anchoring elements. Furthermore, since the ring and anchoring element are not permanently attached to the main strap, there is a chance of loosing them, leaving the cargo securing device inoperable.

OBJECTS AND ADVANTAGES

Several objects and advantages of the present invention are:
 (a) to provide a rack that is very lightweight;
 (b) to provide a rack that is easily removed and stored in as small a space as a glove compartment;
 (c) to provide a rack that is able to be manufactured inexpensively;
 (d) to provide a rack that does not require any disassembly of the bicycle to be transported;
 (e) to provide a rack that prevents damage to bicycles resulting from two or more bicycles coming in contact with one another.
 (f) to provide a rack that can accommodate more than two bicycles without the need to modify the basic model at a higher cost.
 (g) to provide a rack that can be manufactured in different colors as to coordinate with the color of the pickup truck.

Still further objects and advantages will become apparent from a consideration of the ensuing description and drawings.

DRAWING FIGURES

In the drawings, closely related figures have the same number but different alphabetic suffixes.

FIG. 3 is a close-up side view of anchoring the rack to the side of the truck bed.

Figure 1:
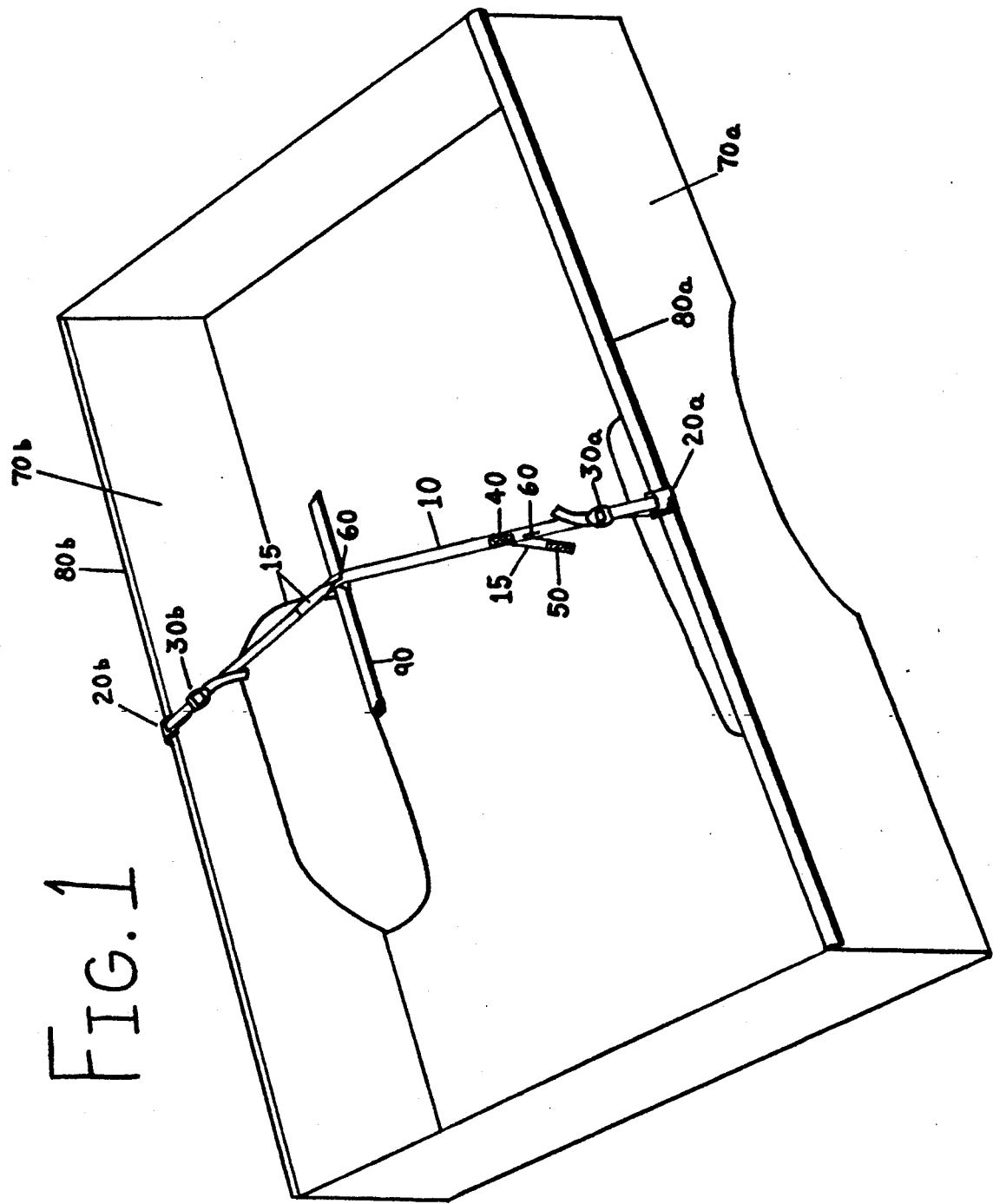
FIG. 1 is a perspective view of one embodiment of the invention showing it in place in the bed of a pickup truck.

REFERENCE NUMERALS IN DRAWINGS 10 strap
15 clasping member
20a right slotted claw
20b left slotted claw
30a right friction buckle
30b left friction buckle
40 "hook" side of Velcro
50 "loop" side of Velcro
60 reinforced slit
70a wall of truck bed on driver's side
70b wall of truck bed on passenger's side
75 interior of truck bed
80a right top lip of truck bed wall
80b left top lip of truck bed wall
90 portion of bicycle top tube

Figure 2:
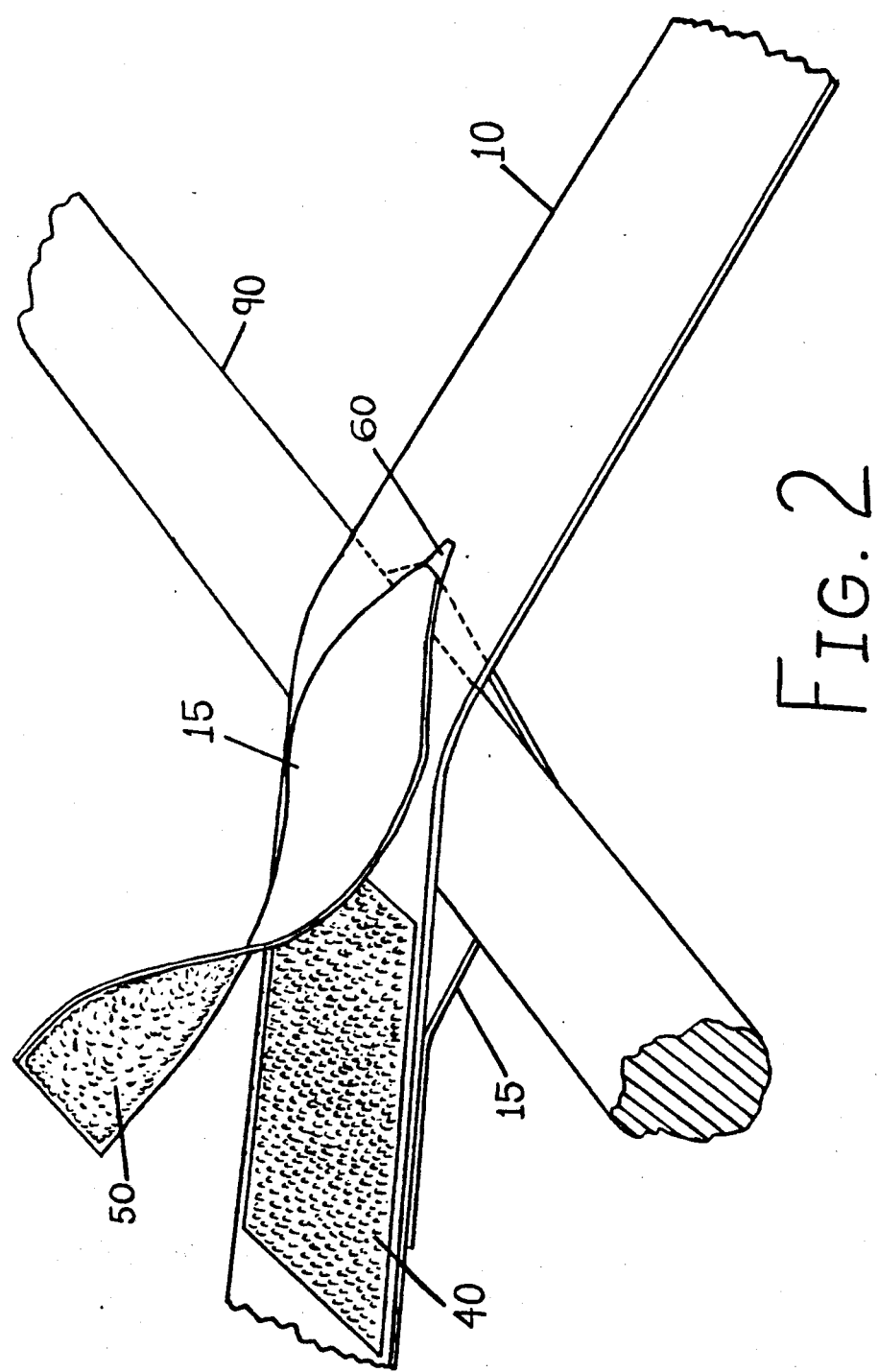
FIG. 2 is a close-up perspective view of securing a cross member or top tube of a bicycle to the rack.

DESCRIPTION-FIGS. 1 to 3 a typical embodiment of the present invention is illustrated in FIG. 1 (perspective view). The rack has a strap 10, roughly 300 cm×2.5 cm, that is flexible enough to be manipulated through a friction buckle 30a and 30b. In the preferred embodiment, the strap 10 is made from nylon. However, any other material flexible enough to be looped into buckles 30a and 30b can be used such as vinyl, cotton, rubber, leather, etc. However, this material must withstand the tension forces produced in strap 10 when strap 10 is fully tensioned. A portion of a bicycle top tube 90 is also shown.

In the preferred embodiment, the ends of strap 10 are inserted into their respective slot of a slotted claw 20a and 20b. The direction of the end of strap 10 are then reversed and strap 10 is folded over the flat end of claws 20a and 20b. Buckles 30a and 30b are situated on strap 10 between claws 20a and 20b. The ends of strap 10, after being folded over the flat end of claw 20a and 20b, is fed through buckles 30a and 30b.

In FIG. 2 a close-up perspective view of securing bicycle top tube 90, a clasping member 15, made from a length of strap material roughly 28 cm×2.5 cm, is fastened, from one end of clasping member 15, to a location near the middle of strap 10. It can be fastened by being sewn, fused, etc. On the free end of clasping member 15, a loop side of VELCRO-brand fastener 50, roughly 9 cm×2 cm, is fastened by being sewn, fused, etc; VELCRO is a trademark of VELCRO USA Inc., Manchester, NH. However, any brand of hook and loop flexible fastener can be used. A reinforced slit or aperture 60 is made into strap 10, about 7 cm from the fastened end of clasping member 15, on clasping member's 15 free end side. Reinforced slit 60 should be roughly 3 cm long running lengthwise on strap 10. Slit 60 can be reinforced by being heavily sewn around the edges, using an eyelet insert, etc. A hook side of VELCRO-brand fastener 40, about 9 cm×2 cm, is fastened on strap 10 on the reverse side of where clasping member 15 was fastened. Hook side of VELCRO-brand fastener 40 is positioned where, when clasping member 15 is inserted through reinforced slit 60 and folded back over toward hook side of VELCRO-brand fastener 40, each side of VELCRO-brand fastener 40 and 50 come in complete contact with each other. Hook side of VELCRO-brand fastener 40 is fastened in the same manner as loop side of VELCRO-brand fastner 50.

FIG. 3 shows a close-up side view of anchoring the rack to the side of the truck. The hooked end of slotted claw 20a or 20b is positioned over a top lip of truck bed wall 80a or 80b in such a way as to avoid slipping from lip 80a or 80b when force is applied toward an interior of truck bed 75.

There are various possibilities as to how many assemblies described in the description of FIG. 2 above can be made into the rack. In the preferred embodiment, four such assemblies are made to accommodate four bicycles.

OPERATIONS-FIGS. 1 to 3

After placing a bicycle lengthwise in interior of truck bed 75 in an upright position, hook slotted claw 20a over top lip of truck bed wall 80a near the center of wall of truck bed 70a, as shown in FIG. 1 and FIG. 3.

Carry remaining slotted claw 20b over top tube of bicycle 90 and hook it on top lip of the truck bed wall 80b in a manner in which strap 10 straddles top tube of bicycle 90. Position top tube 90 between clasping member 15 and reinforced slit 60. Wrap clasping member 15 around the underside of top tube 90 and insert the end of clasping member 15 into slit 60, entering from the underside of strap 10, as shown in FIG. 2. From the top side, pull clasping member 15 till it is tight around top tube of bicycle 90 and lay the end of clasping member 15 with hook side of VELCRO-brand fastener 50 onto loop side of VELCRO-brand fastener 40 located on strap 10.

Once clasping member 15 is firmly in place, fully tension strap 10 through buckles 30a and 30b. Fully tensioning strap 10 prevents the bicycle from bouncing during transportation

SUMMARY, RAMIFICATIONS, AND SCOPE

Accordingly, the reader will see that the bicycle rack of this invention can be used on any pickup truck, can be removed easily and stored in a minimal amount of space, and does not require and disassembly at all of the bicycle to be transported. In addition, the invention is very lightweight and can be manufactured at a fraction of the presently available racks to be used in pickup trucks. Furthermore, the bicycle rack has the additional advantages in that:

it can accomodate more than two bicycles without modifying the basic model;

it prevents damage to bicycles resulting from two or more bicycles coming in contact with one another; and it can be made in different colors to match the color of the truck and/or bicycle.

Although the description above contains many specificities, these should not be construed as limiting the scope of the invention, but as merely providing illustrations of some of the presently preferred embodiments of this invention. For example, the clasping member can be held into place around the top tube by snaps or buttons; the slotted claws can be replaced by hooks; the claws can be placed over the rim of the rear wheel well instead of on the lip of the wall of the truck bed, etc.

Thus the scope of the invention should be determined by the appended claims and their legal equivalents, rather than by the examples given.

I claim:

1. A rack mountable on a pickup truck bed to secure bicycles, said rack comprising:
    (a) a strap having sufficient length to span a width of the truck bed and having a first side and a second side;
    (b) anchoring means associated with said strap for mounting said rack to the truck bed;
    (c) at least one clasping member for securing a portion of a bicycle, said at least one clasping member having a first end and a second end, said first end being attached to said first side of said strap;
    (d) each said clasping member having associated therewith: a first fastening element and a second fastening element, said first fastening element being attached to said second side of said strap and said second fastening element being attached to said second end of said clasping member, an aperture in said strap positioned adjacent said second fastening element whereby said at least one clasping member is positioned on said strap to extend through said aperture such that said first and second fastening elements are secured together.

2. The rack as claimed in claim 1 wherein said anchoring means has a hook portion configured to mount to a wall of the truck bed.

3. The rack as claimed in claim 1 including adjusting means associated with said strap for tightening said strap.

4. The rack as claimed in claim 3 wherein said adjusting means has a buckle positioned on said strap to tension said strap.

* * * * *